United States Patent [19]

Rubens

[11] 4,178,407
[45] Dec. 11, 1979

[54] ABSORBENT FIBROUS TOWEL

[76] Inventor: Harry E. Rubens, 14 Brookside Ct., East Brunswick, N.J. 08816

[21] Appl. No.: 484,169

[22] Filed: Jun. 28, 1974

Related U.S. Application Data

[63] Continuation of Ser. No. 15,819, Mar. 2, 1970, abandoned, which is a continuation of Ser. No. 581,771, Sep. 23, 1966, abandoned.

[51] Int. Cl.² ............................................. B32B 15/00
[52] U.S. Cl. .................................. 428/284; 428/286; 428/288
[58] Field of Search ................. 161/251, 170, 160, 64, 161/82, 155, 270, 67, 250; 128/132, 156, 287, 288, 296; 2/2.5; 428/212, 284, 286, 288, 511, 512, 513, 514, 537, 913

[56] References Cited

U.S. PATENT DOCUMENTS

| | | | |
|---|---|---|---|
| 1,961,914 | 6/1934 | Richter | 161/155 X |
| 2,546,705 | 3/1951 | Strawinski | 161/250 X |

Primary Examiner—Marion E. McCamish
Attorney, Agent, or Firm—Harry Ernest Rubens

[57] ABSTRACT

An article of manufacture such as a towel or article of clothing made of a sheet material having a compliant absorbent surface on both sides thereof made of fibers having little "wet strength", and in between a thin layer of compliant plastic material as a reinforcing support with an adhesive uniformly applied on both sides thereof which is flexible, thin and insoluble when wet and which will not strike through the absorbent material nor change its appearance.

2 Claims, 2 Drawing Figures

ABSORBENT FIBROUS TOWEL

This is a continuation of application Ser. No. 15,819, filed Mar. 2, 1970, now abandoned which is a continuation of application Ser. No. 581,771, filed Sept. 23, 1966, now abandoned.

My invention relates to a towel or other article having absorbent surfaces on both sides thereof.

The article may be conveniently made of paper, but paper sufficiently absorbent for use as a towel, has little "wet strength" and is easily torn. For example, the fingers easily push through a "Kleenex" tissue when wet. Attempts have been made to increase the strength of paper fibers, but this has been accomplished with a loss of absorbency and softness.

It is an object of the invention to provide a highly absorbent material having little "wet strength" in itself, with a reinforcement supplying a high degree of resistance to tearing, without any loss of absorbency.

Another object is to provide the foregoing article with an inexpensive reinforcement that will permit the article to be disposed after a single use.

Figure 2:
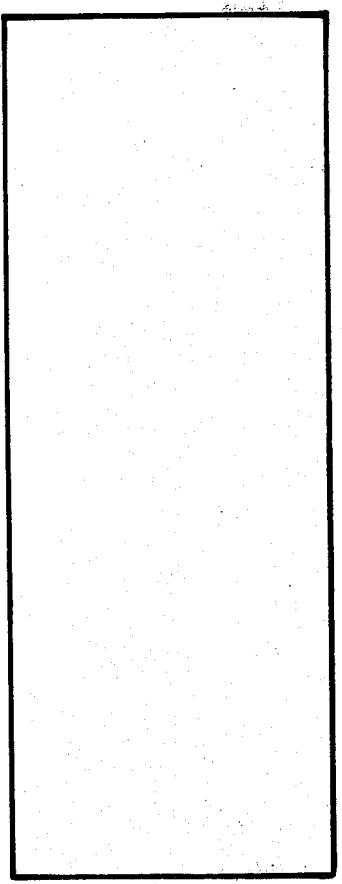
Figure 1:
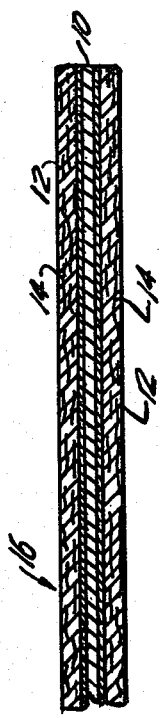

I accomplish these and other objects and obtain my new results as will be apparent from the article described in the following specification, particularly pointed out in the claims, and illustrated in the accompanying drawing in which:

FIG. 1 is an enlarged cross-section of a portion of the towel constructed in accordance with the invention, and FIG. 2 is a plan view of the entire towel.

In the preferred form of my invention, I apply a thin ply of highly absorbent tissue paper to both sides of a thin, highly compliant sheet of plastic that has been uniformly coated throughout with a thin layer of an adhesive. The adhesive, when set, should not substantially lessen the flexibility of the laminated structure. The degree of flexibility sought is approximately that of a cotton hankerchief. An example of such an adhesive is the so-called "pressure sensitive" adhesive shown in U.S. Pat. Nos. 2,532,011 disclosing that . . . "the pressure-sensitive adhesive may be one of the numerous water-insoluble rubbery base or rubber-resin type adhesives, wherein a natural or synthetic rubber base provides cohesion (internal strength) and elasticity (a retractive force when stretched and retraction when released after stretching) and is modified in a way which increases adhesion (tackiness) and decreases cohesion with an attendant modification of stretchiness (elongation under low stresses) and elasticity; thereby resulting in an adhesive having a proper four-fold balance of adhesion, cohesion stretchiness and elasticity. It is this four-fold balance which permits the "adhesive" to be aggressively and stably tacky . . . even though the adhesive is coated upon a glassy-surfaced nonporous film backing having approximately the same adhesion value towards it. The modification of the rubbery base of the adhesive is commonly effected by blending a compatible tackifier resin (such as ester gum) in proportion to secure the desired combination of tacky and non-offsetting properties.

It is possible to use certain synthetics polymer compositions which are inherently normally tacky and pressure-sensitive and possess the above-mentioned four-fold balance of properties, and hence are classed in the art as being of the rubber-resin type . . . . Examples of pressure-sensitive . . . adhesive compositions will not be given in detail as numerous ones are known in the prior art (c.f. U.S. Pat. Nos. 2,156,380; 2,177,627; and 2,319,959). The present polyvinyl carbamate low-adhesion back size coatings have a general effectiveness", 2,607,711 disclosing "The adhesive can be of the normally tacky adhesives employed in making pressure-sensitive tapes . . . . These water-insoluble rubbery base or rubber-resin type adhesives, commonly have a natural or synthetic rubber base . . . . Other illustrative tackier resins in common use are pure hydrocarbon terpene resins (such as "Piccolyte" resin) and hydrogenated indenecoumarone resins (such as "Nevilite" resin). The proportion of tackifier resin is generally in the range of 50 to 100 parts by weight per 100 parts of the rubber base, for making aggressively tacky tapes . . . .

The adhesive may be of the uncolored transparent type . . . ", 2,772,774, 2,926,105 which discloses the method of first priming the plastic film with the dried deposition products of an aqueous emulsion mixture of rubber latex and and hydrophilic collodial agglutinant before applying the pressure-sensitive adhesive "such as one compounded of a butadiene styrene rubbery polymer, or natural rubber or a mixture and a rectifying resin and reissue 24,906 disclosing a pressure-sensitive adhesive coating of acrylate ester copolymer". The adhesives shown in these references are used on a "SCOTCH" transparent tape, which tape represents a film of thin plastic to which has been affixed on one side thereto an adhesive which is flexible, thin and insoluble when wet. Moreover, it will not cause the absorbent material to be mottled in appearance nor strike through the surface thereof and modify its colors or light reflection or its absorbency in any practical manner. Finally, the adhesive is waterproof and can readily be securely attached to the water insoluble film.

Alternately, but of lesser value as a towel, is a construction formed by blowing highly absorbent individual filaments onto a thin, adhering plastic sheet giving it the appearance of an absorbent cloth.

By little "wet strength", I mean a material that by itself cannot be handled when wet because the material will disintegrate due to its low tensile strength approaching zero, and insufficient to maintain the integrity of the unsupported layer of material.

More specifically, a thin sheet of plastic 10, which can be made as thin as 0.0004 inches, is coated with a thin film of adhesive that may be rolled or sprayed thereon. A thin single or multiple ply of tissue paper 14 is then laminated to both sides of the plastic sheet, the adhesive 12 securing the same thereto. The tissue may be first laminated to one side of the plastic sheet, which may then be turned to permit laminating to the remaining side. In mass production, a roll of the laminated material may be formed from which the individual towels 16 may be cut and packaged in layers. The towels may be cut to size from a dispenser, known in the art.

In the alternative form, instead of applying a ply of tissues to the adhering plastic sheet, fine continuous or discontinuous filaments of an absorbing material may be blown onto the adhering film and randomly attached thereto to form a layer, and the excess removed therefrom when the adhesive has set, by blowing or by some other suitable method.

The filaments may be electrostatically applied to obtain an end attachment of the filaments and when the adhesive is dry or sets, the excess may be similarly removed electrostatically.

Some plastic films may be treated by heat or chemicals to make them adherent to the tissue of filaments.

Examples of the plastic films are vinylidene chloride, vinyl chloride copolymer, sold under the trademark SARAN, and polyethylene sold under the trademark POLYFILM. The latter film may be made in a thickness of 0.0015 inches.

It is possible to use the absorbent laminated material for the manufacture of other articles that may require the features of absorbency, strength, lightness, and impermeability. Such articles as napkins, handkerchiefs, pillow cases, bed sheets, bed covers, and articles of clothing such as socks, gloves, raincoats, aprons, hats, shirts, underwear, jackets, pants, etc. may be made of the laminated material. The absorbent surfaces may be printed or otherwise decorated, and sufficient strength may be incorporated in the plastic to make the article washable.

I have described my invention but I desire it understood that it is not confined to the particular forms or uses shown and described, the same being merely illustrative, that the invention may be carried out in other ways without departing from the spirit of my invention, and coming within the scope of the appended claims, and by means of which, objects of my invention are obtained and new results accomplished.

I claim:

1. An article of manufacture consisting of a thin compliant plastic sheet upon which is uniformly provided throughout on both sides thereof, an adhesive layer to which is adhered, a dry layer of soft, compliant, absorbent material having the absorbency of facial tissue with insufficient wet strength to permit handling when wet, said adhesive layer characterized by being flexible, thin, and insoluble when wet, and which will not strike through the absorbent material, nor change its appearance; said plastic sheet, adhesive and absorbent material, when assembled into the article of manufacture, having the softness and pliability of facial tissue, wherein the layer of compliant, absorbent material consists of loose fibers, each randomly attached to the adhering layer on the plastic sheet.

2. An article of manufacture consisting of a thin compliant plastic sheet upon which is uniformly provided throughout on both sides thereof, an adhesive layer to which is adhered, a dry layer of soft, compliant, absorbent material having the absorbency of facial tissue with insufficient wet strength to permit handling when wet, said adhesive layer characterized by being flexible, thin, and insoluble when wet, and which will not strike through the absorbent material, nor change its appearance; said plastic sheet, adhesive and absorbent material, when assembled into the article of manufacture, having the softness and pliability of facial tissue, wherein the layer of compliant, absorbent material consists of loose fibers, each individually attached to the adhering layer on the plastic sheet.

* * * * *